(No Model.)
I. W. PARMENTER.
Air Purifying Apparatus.
No. 236,839. Patented Jan. 18, 1881.
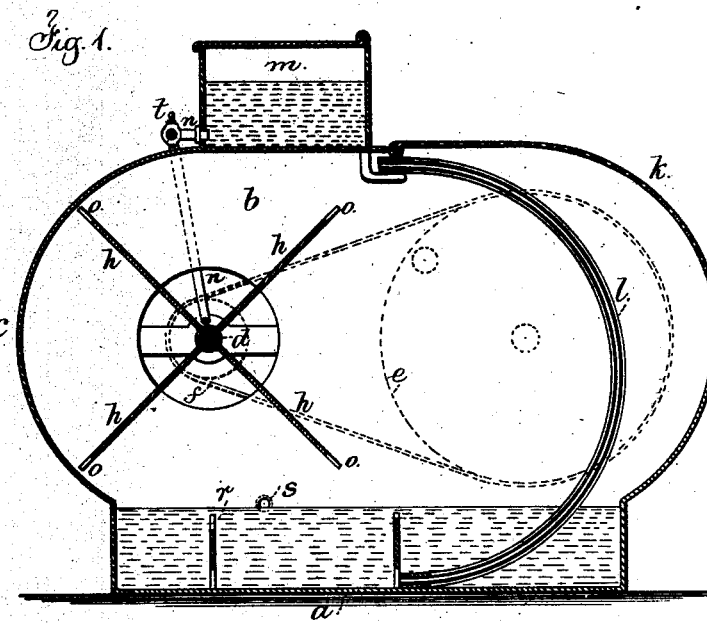
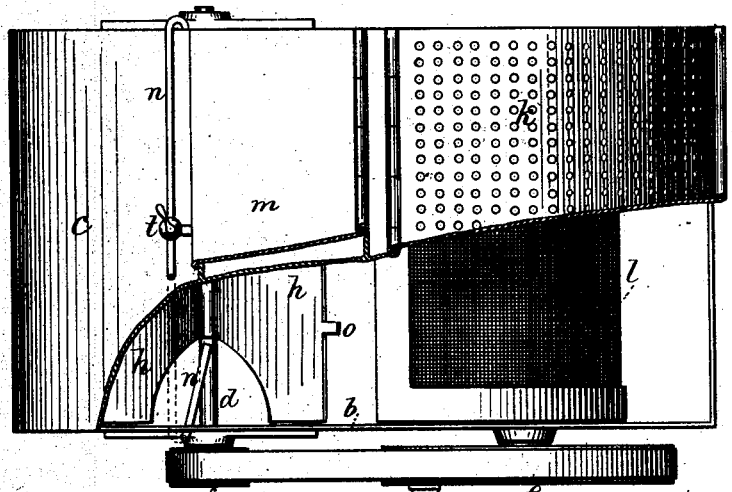

UNITED STATES PATENT OFFICE.

ISAAC W. PARMENTER, OF NEW YORK, N. Y.

AIR-PURIFYING APPARATUS.

SPECIFICATION forming part of Letters Patent No. 236,839, dated January 18, 1881.

Application filed May 25, 1880. (No model.)

*To all whom it may concern:*

Be it known that I, ISAAC W. PARMENTER, of the city and State of New York, have invented an Improved Air-Purifying Apparatus, of which the following is a specification.

Air has been purified by coming into contact with the surface of water or with a wet screen, upon which the dust and particles of solid matter have been deposited.

My invention relates to a means for atomizing water or other liquid, and at the same time forcing a current of air to pass through the chamber containing the spray, thereby insuring the removal of foreign substances from the air and causing more or less humidity, in consequence of the vapors driven off from the liquid, and this liquid may be either a perfume, a disinfectant, or a remedial agent. By this improvement a room or dwelling may be fumigated, disinfected, deodorized, or purified, and that with great rapidity, because my apparatus forces a circulation of the atmosphere.

In the drawings, Figure 1 is a vertical section of the apparatus, and Fig. 2 a is plan partially in section.

The case of the apparatus is preferably of sheet metal, *a* being the bottom, *b b* the sides, and *c* the curved end.

*d* is a shaft, supported in bearings upon the sides *b*, and driven by the wheel *e* and belt to the small pulley *f*. The sides *b b* are open around the shaft *d*, and there are upon such shaft *d* fans *h*, so as to form a blower, the air being drawn in through the openings in *b* and driven off through the perforated cover *k*, which cover is hinged, so that it can be lifted to give access to the interior of the case.

There is a stationary screen, *l*, which, by preference, is curved. It is placed between the fan-blower and the perforated cover *k*. This screen *l* is usually made of two thicknesses of wire-cloth with a layer of fibrous material intervening, the object being to allow the air to pass freely, but to catch any spray or moisture that might otherwise be thrown through the perforated cover *k*.

Above the case there is a box or water-vessel, *m*, adapted to receive water, perfume, or any liquid material adapted to disinfecting or purifying the atmosphere. The pipes *n* lead from the vessel *m* into the ends of the blower-case, and a cock, *t*, regulates the quantity of liquid that is allowed to drip from the ends of these pipes upon the revolving fans, and these throw off such liquid in the form of spray into the atmosphere within the case at the same time that these fans also induce a current of air through the purifier, so that the air is brought into intimate contact with the atomized liquid. The screen *l* is kept moist by this liquid, and so, also, is the interior of the case; and the liquid accumulates in the bottom of such case or is supplied into the same until it rises sufficiently for the fingers *o*, that project from the outer edges of the fans, or from the shaft, to dip into such liquid and increase the amount of moisture or atomized liquid that there is within the chamber, and at the same time the quantity of liquid thrown upon the screen will be sufficient to wash down any particles of dust or other foreign matter and keep the screen clean.

To prevent the blower-fans agitating the water and producing waves that would cause the edges of the buckets to dip into the water too deeply, I make use of a partition, *r*, that is placed across the water-space in the bottom of the case and adjacent to the path described by the revolving fingers and fans; and there is to be an overflow at *s*, to prevent the accumulation of water in the case. By this means surplus water and impurities may be conveyed away from time to time.

This apparatus will usually be portable and operated by hand; but it may be of any desired size and driven by power.

If desired to refrigerate the air as well as purify it, ice will be introduced into the vessel *m* with the water. If, on the other hand, the temperature has to be maintained or even increased, then warm or hot water will be inserted into the water-vessel, or the air may be warmed in any suitable manner before or after it passes through the fan, and heating-tubes may be applied within the case of the purifier, if desired.

I do not claim an air-purifying apparatus in which there is a shaft with spiral fans revolving in a vessel that contains water for the ends of the fans to enter, as this has been used.

I claim as my invention—

1. In an air-purifying apparatus, the combination, with the blower and its case, of a vessel for liquid and pipes from the same to the blower, for allowing the liquid to run upon the blower-fans, substantially as set forth.

2. The combination, in an air-purifying apparatus, of a blower, a case for the same, a perforated cover, and a stationary screen with a vessel for holding liquid and pipes for supplying such liquid to the blower, substantially as set forth.

3. The combination, in an air-purifying apparatus, of a case adapted to hold liquid in the lower portion thereof, a revolving blower having fans that are parallel, or nearly so, to the shaft, fingers attached to the fans and projecting beyond their outer edges to dip into and spray the liquid, and a screen that arrests the liquid, but allows the passage of the air, substantially as set forth.

4. The combination, in the air-purifying apparatus, of the revolving fans, a screen, and the partition $r$ within the water and extending to the surface of the same, or nearly so, for the purposes and substantially as set forth.

Signed by me this 21st day of May, A. D. 1880.

I. W. PARMENTER.

Witnesses:
GEO. T. PINCKNEY,
WILLIAM G. MOTT.